United States Patent
Grant et al.

(10) Patent No.: US 10,642,608 B2
(45) Date of Patent: *May 5, 2020

(54) ASSOCIATING A VISUALIZATION OF USER INTERFACE WITH SOURCE CODE

(71) Applicant: International Business Machines Corporation, Armonk, NY (US)

(72) Inventors: Cristina L. Grant, Miami, FL (US); Patricia Leon, Miami, FL (US); Adriana Valido, Miami, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,767

(22) Filed: Oct. 15, 2018

(65) Prior Publication Data

US 2019/0079757 A1    Mar. 14, 2019

Related U.S. Application Data

(63) Continuation of application No. 14/948,703, filed on Nov. 23, 2015, now Pat. No. 10,101,994, which is a
(Continued)

(51) Int. Cl.
G06F 8/71 (2018.01)
G06F 8/73 (2018.01)
G06F 8/34 (2018.01)

(52) U.S. Cl.
CPC .................. *G06F 8/71* (2013.01); *G06F 8/34* (2013.01); *G06F 8/73* (2013.01)

(58) Field of Classification Search
CPC .................. G06F 8/71; G06F 8/73; G06F 8/34
(Continued)

(56) References Cited

U.S. PATENT DOCUMENTS 8,261,235 B2   9/2012   Chapman
8,266,585 B2   9/2012   Funto et al.
(Continued)

FOREIGN PATENT DOCUMENTS

CN    1764899 A     4/2006
CN    101030138 A   9/2007
CN    101286119 A   10/2008

OTHER PUBLICATIONS

Paudyal, K., "How to capture a screenshot using Java and save it to a file?," [Online] Kushal's Java Blog / Software Engineering Blog, Apr. 25, 2013 [retrieved Oct. 8, 2013] retrieved from the Internet: <http://sanjaal.com/java/tag/java-screenshot-capture-source-code/>, 5 pg.
(Continued)

*Primary Examiner* — John Q Chavis
(74) *Attorney, Agent, or Firm* — Cuenot, Forsythe & Kim, LLC

(57) ABSTRACT

Visualizing user interfaces specified by source code includes executing, using a development application, source code including a segment of source code specifying a user interface and, responsive to executing the segment of source code, generating, using a processor, a first screenshot including the user interface. The first screenshot is correlated with the segment of source code. The first screenshot is stored in association with the segment of source code.

18 Claims, 4 Drawing Sheets

Related U.S. Application Data continuation of application No. 14/229,140, filed on Mar. 28, 2014, now Pat. No. 9,201,648, which is a continuation of application No. 14/063,834, filed on Oct. 25, 2013, now Pat. No. 9,298,450.

(58) Field of Classification Search
USPC .......................................................... 717/109
See application file for complete search history.

(56) References Cited

U.S. PATENT DOCUMENTS

| | | | |
|---|---|---|---|
| 9,201,648 | B2 | 12/2015 | Grant et al. |
| 9,298,450 | B2 | 3/2016 | Grant et al. |
| 10,101,994 | B2 | 10/2018 | Grant et al. |
| 2004/0189718 | A1 | 9/2004 | Stein et al. |
| 2007/0234271 | A1 | 10/2007 | Winkler et al. |
| 2008/0270343 | A1 | 10/2008 | Brodsky et al. |
| 2008/0270983 | A1 | 10/2008 | Ahadian et al. |
| 2009/0216790 | A1* | 8/2009 | Dexter .................. G06F 17/24 |
| 2010/0037150 | A1 | 2/2010 | Sawant |
| 2010/0076946 | A1 | 3/2010 | Barker et al. |
| 2010/0211865 | A1 | 8/2010 | Fanning et al. |
| 2010/0211893 | A1 | 8/2010 | Fanning et al. |
| 2011/0191676 | A1 | 8/2011 | Guttman et al. |
| 2012/0011432 | A1 | 1/2012 | Strutton |
| 2012/0015674 | A1* | 1/2012 | LeBeau ............... H04M 3/4931 |
| | | | 455/456.3 |
| 2012/0042281 | A1 | 2/2012 | Green |
| 2012/0084321 | A1* | 4/2012 | Dexter .................. G06F 16/93 |
| | | | 707/772 |
| 2012/0204151 | A1 | 8/2012 | Ientile et al. |
| 2013/0014093 | A1 | 1/2013 | Lee |
| 2014/0218385 | A1 | 8/2014 | Carmi |
| 2015/0121340 | A1 | 4/2015 | Grant et al. |
| 2015/0121341 | A1 | 4/2015 | Grant et al. |
| 2016/0077830 | A1 | 3/2016 | Grant et al. |

OTHER PUBLICATIONS

Yeh, T. et al., "Creating Contextual Help for GUIs Using Screenshots," Proc. of 24th Annual ACM Symposium on User Interface Software and Technology (UIST '11), Oct. 16-19, 2011, pp. 145-154.

"Visualizing and Understanding Code," [Online] Microsoft, Inc. © 2013 MSDN Visual Studio [retrieved Jul. 31, 2013] retrieved from the Internet: <http://msdn.microsoft.com/en-us/library/vstudio/dd409365.aspx>, 5 pg.

"Method for Extracting Problem Solving Information from Reports that Include Screenshots and Images," IP.com Prior Art Database, Disclosure No. IPCOM000223678D, Nov. 23, 2012 [retrieved Oct. 25, 2013], retrieved from the Internet: <http://ip.com/IPCOM/000223678>, 3 pg.

"Macietta: More UI Design and development power," W3 SWG Technical Community, IBM Corporation, Jun. 13, 2012, retrieved from Internet: <http://w3.ibm.com/articles/swgtech/2012/06/st_maqetta_q2_2012.html>.

"About Maqetta / Installing Maqetta" [Online] Maqetta Documentation [retrieved Oct. 9, 2013] retrieved from the Internet: <app.maqetta.org/maqetta/app/docs/index.html#overview], 6 pg.

"Firebug, Web Development Evolved," [Online] Mozilla © 2005-2010 [retrieved Oct. 25, 2013] retrieved from the Internet: <http://getfirebug.com/whatisfirebug>, 7 pg.

U.S. Appl. No. 14/063,834 Non-Final Office Action, dated Mar. 18, 2015, 7 pg.

U.S. Appl. No. 14/063,834 Final Office Action, dated Aug. 4, 2015, 6 pg.

U.S. Appl. No. 14/063,834 Advisory Action, dated Nov. 12, 2015, 3 pg.

U.S. Appl. No. 14/063,834 Notice of Allowance, dated Dec. 14, 2015, 5 pg.

U.S. Appl. No. 14/229,140 Notice of Allowance, dated Jul. 23, 2015, 7 pg.

U.S. Appl. No. 14/948,703, Non-Final Office Action, dated Aug. 23, 2017, 6 pg.

U.S. Appl. No. 14/948,703, Notice of Allowance, dated Jun. 7, 2018, 5 pg.

* cited by examiner

ASSOCIATING A VISUALIZATION OF USER INTERFACE WITH SOURCE CODE

BACKGROUND

Software developers work on many different projects over their careers. When tasked with solving a problem for a current project, an experienced software developer may recall previously written source code that either solves the problem at hand or a similar problem. In the case of user interface development, locating a portion of previously written source code can be difficult. Of even greater difficulty is recalling what the portion of source code looks like when rendered.

A prior source code solution, for example, may specify certain visual features of a user interface that are desired for the software developer's current project. In many cases, the computing system of the software developer is no longer able to rerun the prior source code solution. This complicates searching for the desired source code. Even in the case where the software developer does locate previously written source code, the software developer is unable to verify that the located source code does, in fact, specify the desired visual features since visual verification requires execution of the source code in order to render the user interface.

SUMMARY

A method includes executing source code including a segment of source code specifying a user interface, responsive to executing the segment of source code, generating, using a processor, a first screenshot including the user interface. The method further includes correlating the first screenshot with the segment of source code and storing the first screenshot in association with the segment of source code.

A system includes a processor programmed to initiate executable operations. The executable operations include executing source code including a segment of source code specifying a user interface and, responsive to executing the segment of source code, generating a first screenshot including the user interface. The processor is further programmed to initiate executable operations including correlating the first screenshot with the segment of source code and storing the first screenshot in association with the segment of source code.

A computer program includes a computer readable storage medium having program code stored thereon. The program code is executable by a processor to perform a method. The method includes executing, using the processor, source code including a segment of source code specifying a user interface and, responsive to executing the segment of source code, generating, using the processor, a first screenshot including the user interface. The method further includes correlating, using the processor, the first screenshot with the segment of source code and storing, using the processor, the first screenshot in association with the segment of source code.

DETAILED DESCRIPTION

Figure 1:
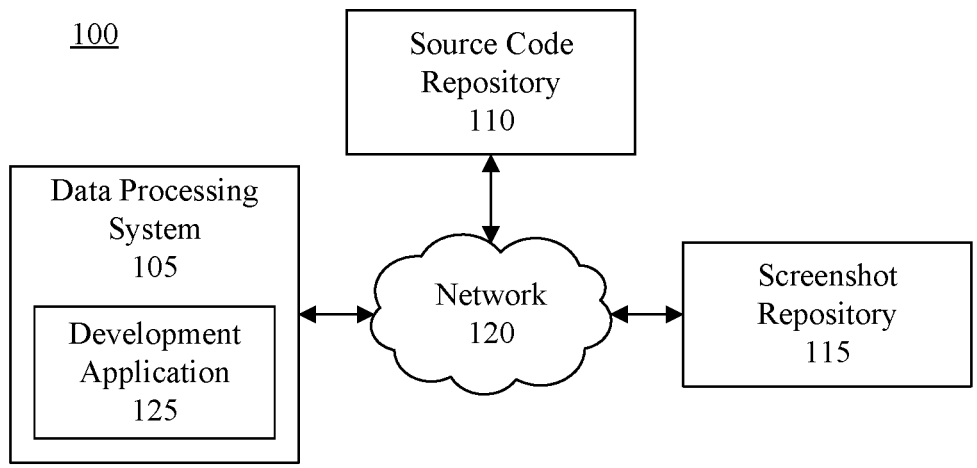
FIG. 1 is a block diagram illustrating an example of a network computing system.

While this disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to visualizing user interfaces specified by source code. More particularly, this disclosure relates to generating a screenshot of a user interface (UI) and storing the screenshot in association with the source code that, when executed, implements the UI. In accordance with the inventive arrangements disclosed herein, source code of a computer program is executed. Execution of a segment of the source code that specifies a UI is detected using any of a variety of different detection techniques. A screenshot of the UI is generated responsive to detecting execution of the segment of source code. A correlation between the screenshot and the segment of source code specifying the UI is determined. The screenshot is stored in association with the segment of the source code.

In another aspect, as the segment of source code is modified, further screenshots may be generated and associated with the modified segment of source code. As source code is further modified and additional screenshots are generated, a history of different versions of the source code and associated screenshots are generated and stored. Screenshots also may be associated with one or more tags. Further, one or more particular visual elements within a screenshot may be identified and correlated with sub-segments of the segment of the source code associated with the screenshot.

The inventive arrangements described within this disclosure facilitate searching of source code. For example, a developer can visually browse screenshots of UIs or UI components, search and/or filter source code and/or screenshots by tag to locate a particular segment of source code, or the like, without having to re-execute the segment of source code to observe the visual elements specified by the source code. These and other features will be described in further detail below with reference to the figures.

As defined herein, the term "screenshot" means a digital image that records visible items that are displayed or that are output for display on a visual output device such as a monitor. A screenshot can be generated in any of a variety of different ways. For example, a processor of a data processing system executing program code, whether a host operating system or application software, can generate a screenshot. The processor may generate the screenshot from source code and/or from display data that is output from and/or generated by the data processing system. As such, the screenshot may be generated with or without actually displaying any visible items of the source code on the visual output device. A screenshot also may be generated by a camera taking a picture of an image on a visual output device and providing the screenshot to a data processing system.

FIG. 1 is a block diagram illustrating an example of a network computing system 100. Network computing system 100 includes a data processing system 105, a source code repository 110, and a screenshot repository 115. Data processing system 105, source code repository 110, and screenshot repository 115 are coupled by a network 120. Network 120 is the medium used to provide communications links between various devices and data processing systems connected together within network computing system 100. Network 120 may include connections, such as wire, wireless communication links, or fiber optic cables. Network 120 can be implemented as, or include, any of a variety of different communication technologies such as a WAN, a LAN, a wireless network, a mobile network, a Virtual Private Network (VPN), the Internet, the Public Switched Telephone Network (PSTN), or the like.

Data processing system 105 includes a development application 125. Data processing system 105, in executing development application 125, is configured to edit, execute, and/or preview or render source code. Data processing system 105 further is configured to generate screenshots of user interfaces (UIs) that are specified by source code executed by development application 125.

Source code repository 110 can be implemented as a data processing system such as a server, a data storage device, or the like. Source code repository 110 includes source code for one or more different software projects, i.e., software products or systems. A user may access source code repository 110 utilizing data processing system 105. The user, for example, may access source code files stored within source code repository 110, check out source code files, check in source code files whether modified or not, version source files, and the like.

Screenshot repository 115 can be implemented as a data processing system such as a server, a data storage device, or the like. Screenshot repository 115 includes screenshots that are associated with one or more segments and/or subsegments of source code. The screenshots stored within screenshot repository 115 may be generated or provided by data processing system 105 and/or one or more other data processing systems (not shown) that are coupled to screenshot repository 115 via network 120. Further, the screenshots stored in screenshot repository 115 may correspond to source code from one or more different software projects and one or more different versions of the software project(s). Screenshot repository 115 also may store tags in association with screenshots and/or sections of screenshots as described in further detail within this specification.

In operation, a user, working through data processing system 105, retrieves source code from source code repository 110. In another aspect, a user working through data processing system 105 can create new source code that later may be stored in source code repository 110. In any case, responsive to the user executing a segment of the source code within data processing system 105, data processing system 105 generates a screenshot. More particularly, responsive to the user executing the source code within development application 125, the execution of a segment of source code that specifies a UI is detected. A screenshot including the UI is generated by data processing system 105 and stored within screenshot repository 115. The screenshot generated by data processing system 105 is stored in association with the detected segment of source code.

For example, screenshots may be stored with a reference or link to the segment of source code that specifies the UI included in the screenshot. Selection of the screenshot may execute the link and retrieve the segment of source code or cause a browser to navigate to the segment of source code in the source code repository.

In another example, the various systems illustrated in FIG. 1 may be combined. In illustration, data processing system 105 may include a source code repository and a screenshot repository stored locally therein. In that case, the various operations described may be performed by data processing system 105 without one or more other external systems operating in cooperation with data processing system 105.

It should be appreciated that the examples illustrated in FIG. 1 are provide for purposes of illustration only. As such, the examples are not intended as limitations.

Figure 2:
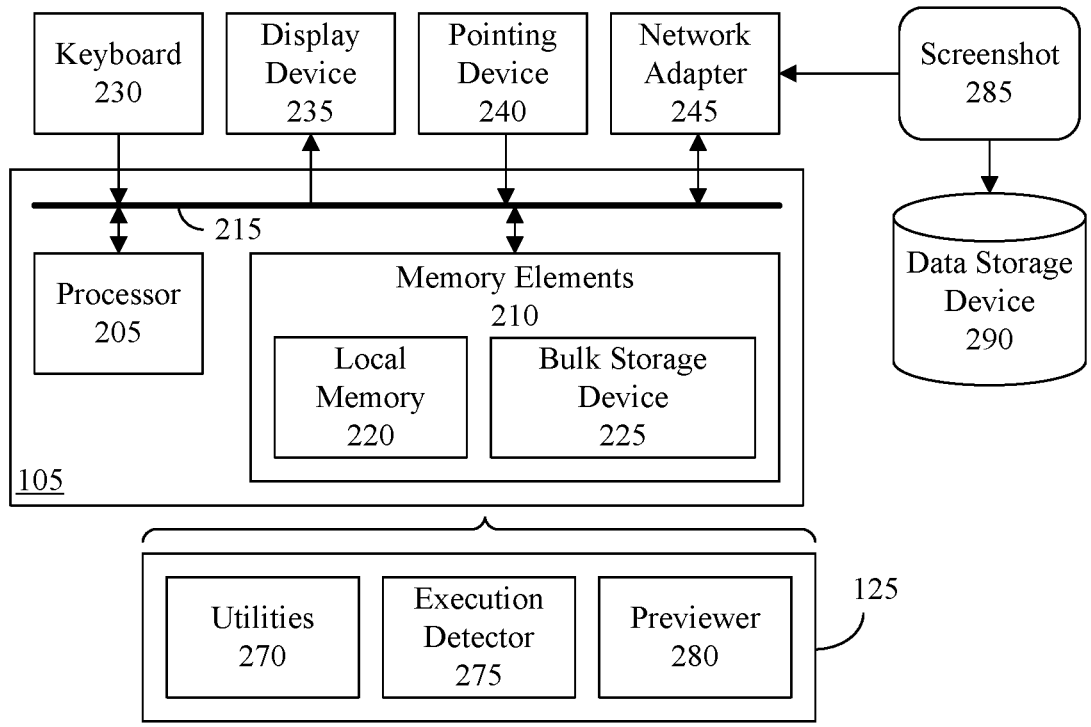
FIG. 2 is a block diagram illustrating an example of a data processing system.

FIG. 2 is a block diagram illustrating an example of data processing system (system) 105 of FIG. 1. System 105 can include at least one processor (e.g., a central processing unit) 205 coupled to memory elements 210 through a system bus 215 or other suitable circuitry. As such, system 105 can store program code within memory elements 210. Processor 205 executes the program code accessed from memory elements 210 via system bus 215 or the other suitable circuitry.

In one aspect, system 105 is implemented as a computer or other programmable data processing apparatus that is suitable for storing and/or executing program code. It should be appreciated, however, that system 105 can be implemented in the form of any system including a processor and memory that is capable of performing and/or initiating the functions and/or operations described within this disclosure. Further, system 105 can be implemented in a variety of different form factors including, but not limited to, a portable device such as a mobile communication device, a tablet computing and/or communication device, a laptop computing device, a desktop computing device, a server, or the like.

Memory elements 210 include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 can be implemented as a hard disk drive (HDD), solid state drive (SSD), or other persistent data storage device. System 105 also can include one or more cache memories (not shown) that provide temporary storage of at least some program code in order to reduce the number of times program code must be retrieved from bulk storage device 225 during execution.

Input/output (I/O) devices such as a keyboard 230, a visual output device such as display device 235, and a pointing device 240 optionally may be coupled to system 105. The I/O devices can be coupled to system 105 either directly or through intervening I/O controllers. One or more network adapters 245 also can be coupled to system 105 to enable system 105 to become coupled to other systems, computer systems, remote printers, and/or remote storage devices through intervening private or public networks. Modems, cable modems, wireless transceivers, and Ethernet cards are examples of different types of network adapters 245 that can be used with system 105.

As pictured in FIG. 2, memory elements 210 can store development generation application 125. In one example, development application 125 includes utilities 270, an execution detector 275, and a previewer 280. Development application 125, being implemented in the form of executable program code, is executed by system 105 and, as such, is considered an integrated part of system 105. Development application 125, screenshots, tags, source code, and any other parameters and/or attributes utilized by system 105, are functional data structures that impart functionality when employed as part of system 105.

Development application 125 supports development of source code by a user such as a software developer. For example, utilities 270 can include a source code editor, a source code debugger, a compiler, ability to execute or simulate execution of source code, etc. Using one or more utilities 270, a user may edit and initiate testing of source code. Previewer 180 is configured to display or present a visual representation of executed source code. For example, source code or a segment thereof that specifies a UI can be executed by utilities 270 with the UI that is specified by the source code being displayed, i.e., rendered, by previewer 180 upon display device 235.

Execution detector 275 is configured to detect when a segment of source code that specifies a UI is executed. Execution detector 275, having detected execution of source code specifying a UI, either generates or initiates the generation of a screenshot that includes the UI or at least a portion of the UI specified by the executed segment of source code.

In one aspect, execution detector 275 is configured to analyze source code and detect UI components and/or structures located therein. Execution detector 275, having identified segments of source code including or specifying a UI, can detect when the segment of source code is executed within development application 125. For example, when the source code is a markup language, e.g., HyperText Markup Language or the like, execution detector 275 is configured to recognize particular markup language structures such as tags and/or other elements of a UI and determine when such items are executed. Execution detector 275 can perform a similar analysis for other varieties of source code. Further examples of source code include, but are not limited to, object oriented programming languages such as Java, Smalltalk, C++, conventional procedural programming languages such as the "C" programming language or other similar programming languages, and scripting languages.

In another aspect, execution detector 275 is implemented by instrumenting the source code. Source code can be instrumented with additional source code that either directly performs various functions or invokes functions of execution detector 275. The additional source code that is added to the source code under development, for example, may be added following the segment of source code that specifies a UI, after sub-segments of such source code, or after each UI element and/or widget of source code that forms a UI.

It should be appreciated that development application 125 may be implemented in any of a variety of different configurations. In one example, development application 125 is implemented as an integrated development environment (IDE). In another example, development application 125 is implemented as a browser that includes or utilizes one or more plug-ins or extensions. For example, some browsers provide utilities 270 that reveal source code, e.g., markup language, and/or allow editing of the source code. The browser can render the source code to implement previewer 280. One or more extensions can be included within the browser that implement execution detector 275. Another exemplary implementation of development application 125 can include a combination of an IDE and a browser utility that inter-operate to perform the functions described herein.

In operation, a developer may be working in development application 125 on a segment of source code. The segment of source code, for example, may be checked out of a software configuration management system or the like. The user selects an option within development application 125 that executes the segment of source code. For example, execution of the segment of source code may be for purposes of testing. In one aspect, previewer 280 can display the UI that is specified by the segment of source code that is executed.

Responsive to execution of the segment of source code within development application 125, execution detector 275 initiates generation of a screenshot 285. As noted, in one aspect, execution of the segment of source code is detected through execution of source code that is inserted into the source code under development using a process called instrumentation. The source code inserted through instrumentation may be inserted within the segment or sub-segment(s) of source code, prior to the segment and/or sub-segment(s) of source code, following the segment and/or sub-segment(s) of source code, or the like. In any case, the source code inserted through instrumentation can indicate to execution detector 275 that a particular portion, whether a segment and/or sub-segment, of the source code has executed, is being executed, or is about to be executed.

In another aspect, source code may be analyzed as executed to identify segments and/or sub-segments that specify a UI. In the case, of markup-language, for example, the markup-language may be parsed and evaluated to identify segments and/or sub-segments that specify a UI or elements of a UI. Execution detector 275, for example, can perform such parsing and/or analysis as the markup language is provided to previewer 280.

Screenshot 285 includes the UI that is specified by the segment of source code that was executed. In one aspect, execution detector 275 initiates generation of screenshot 285 by invoking a function of the operating system of system 105. In another aspect, execution detector 275 generates screenshot 285. In either case, the UI need not actually be displayed by previewer 280 upon display device 235 in order to generate screenshot 285.

In another aspect, execution detector 275 can be coupled to a camera focused on display device 235. In that case, execution detector 275 instructs the camera to generate screenshot 285 by taking a picture of display device 235 with the UI displayed thereon. Screenshot 285 can be sent or transmitted to system 105 from the camera via a communication link, whether wired or wireless.

Regardless of the manner in which screenshot 285 is generated, system 105 stores screenshot 285 in association with the segment of source code that specifies the UI captured within screenshot 285. As illustrated in FIG. 2, system 105 stores screenshot 285 within a data storage device 290. Screenshot 285 is stored in association with the segment of source code specifying the UI contained within screenshot 285.

In one aspect, data storage device 290 may be included as part of a software configuration management system that stores versions of source code of a computer program. In another aspect, data storage device 290 may be part of or form the source code repository of FIG. 1. In another aspect, however, screenshot 285 may be stored locally within memory elements 210 in association with the segment of source code or a copy thereof, whether stored within local memory 220 and/or within bulk storage device 225.

Figure 3:
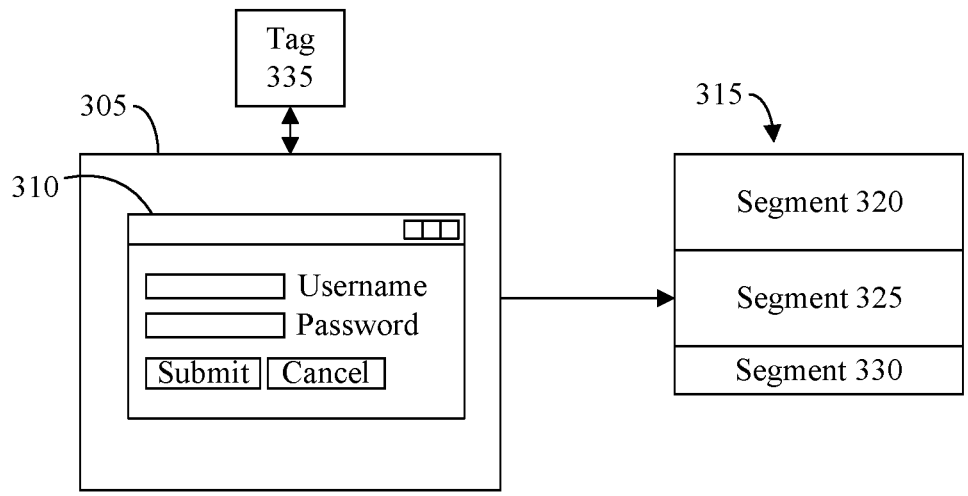
FIG. 3 is a block diagram illustrating an exemplary association between a screenshot and a segment of source code.

FIG. 3 is a block diagram illustrating an exemplary association between a screenshot and a segment of source code. FIG. 3 shows a screenshot 305 and source code 315. Screenshot 305 includes a UI 310. Source code 315 includes segments 320, 325, and 330. As defined herein, a "segment," when used in reference to source code, is a plurality of lines of source code. In one aspect, a segment is a portion of source code having a formal or defined structure such as a module, an object, a method, or other unit of source code that may have a hierarchal ordering within the source code. As defined herein, a "sub-segment," in reference to source code, is a portion of a segment of source code which is less than the whole of the segment of source code. Accordingly, a sub-segment may refer to a single line of source code, a portion of a module, a portion of an object, a portion of a method or the like.

For purposes of discussion, segment 325 specifies UI 310. As defined herein, a segment of source code that "specifies" a UI means that execution of the segment of source code results in generation of the UI. Execution of the segment of source code results in the UI being displayed upon a display device or the generation of display data that, when provided to a display device, causes the UI to be displayed thereon. Screenshot 305 may be generated in either case.

Segments 320, 325, and 330 are identifiable by execution detector 375 through an analysis of the structure of source code 315. Source code 315, for example, may be hierarchically ordered, include modules, tags, and the like. As such, execution detector 275 can detect when a segment of source code 315 is executed that specifies a UI such as UI 310. In this example, execution detector 275 detects execution of segment 325. Responsive to detecting execution of segment 325, screenshot 305 is generated. Screenshot 305 includes UI 310. Execution detector 275 stores screenshot 305 in association with segment 325 of source code 315. Storing screenshot 305 in association with segment 325 means that screenshot 305 is stored with a reference to segment 325, whether a link, a pointer, or other mechanism for programmatically establishing and/or memorializing an association between segment 325 and screenshot 305.

In one aspect, the stored association with segment 325 can particularly indicate segment 325. For example, consider the case where segments 320, 325, and 330 are implemented within a single source code file. In that case, the association that is stored would indicate the source code file, but also the particular lines of code within the source code file corresponding to segment 325. Alternatively, if segments 320, 325, and 330 each are separate files, the association need only specify segment 325.

FIG. 3 also illustrates that one or more tags, illustrated as tag 335, may be associated with screenshot 305. Since screenshot 305 is associated with segment 325, tag 335 is also associated with segment 325. In any case, tag 335 can be assigned by a user, e.g., a developer, or the like. As defined herein, a "tag" is a keyword or term that is assigned to a digital asset and, more particularly, to a screenshot. Tags assigned to digital assets such as screenshot 305 may have a hierarchical organization or be non-hierarchical, e.g., "flat." Assigning tags to screenshots allows the screenshots to be searched and/or queried for particular features or attributes described or specified by the tags.

Figure 4:
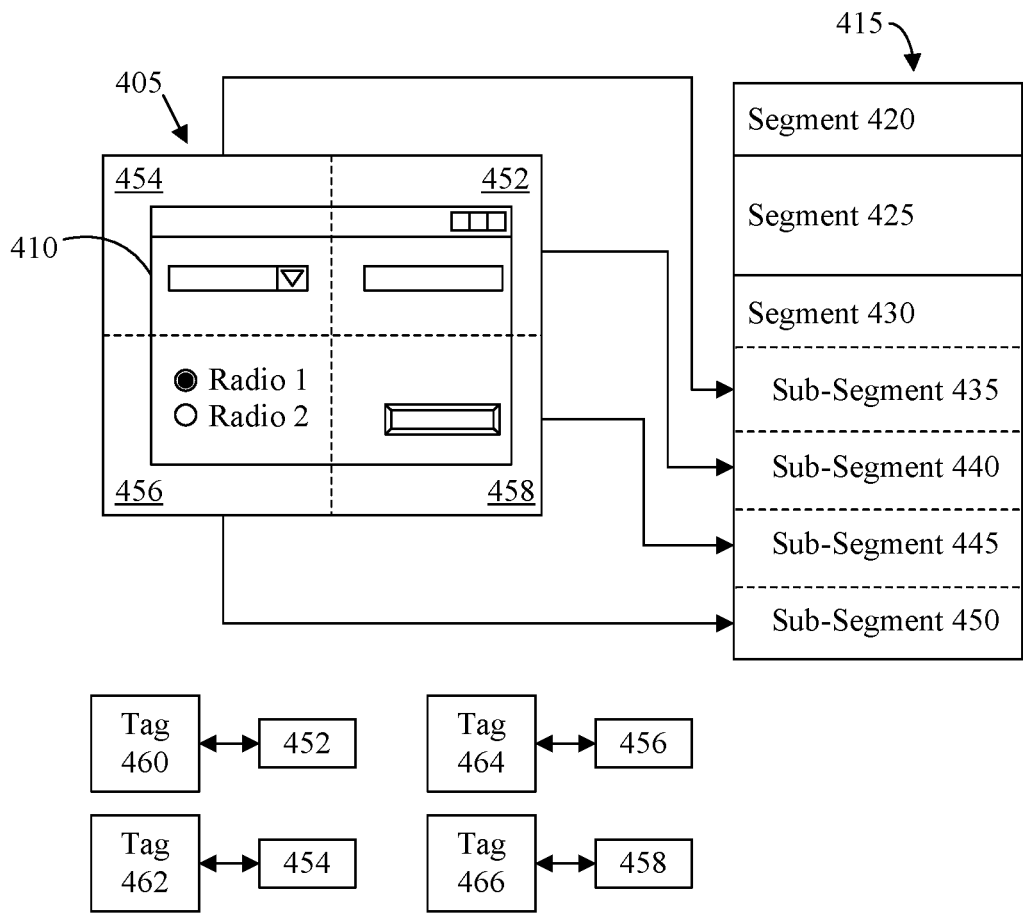
FIG. 4 is a block diagram illustrating another exemplary association between a screenshot and a segment of source code.

FIG. 4 is a block diagram illustrating another exemplary association between a screenshot and a segment of source code. As pictured, FIG. 4 shows a screenshot 405 and source code 415. Screenshot 405 includes a UI 410. Source code 415 includes segments 420, 425, and 430. Segment 430 includes sub-segments 435, 440, 445, and 450.

In this example, execution detector 275 detects execution of segment 430. In another example, execution detector 275 can detect execution of each of sub-segments 435, 440, 445, and 450 independently of one another. Responsive to detecting execution of segment 430, screenshot 405 is generated. Screenshot 405 is subdivided into multiple sections. In this example, each section is a quadrant of screenshot 405 using an x-y coordinate system with the origin located at the center of screenshot 405. It should be appreciated, however, that screenshot 405 can be subdivided into 2, 3, 4, or more sections as required and that the subdividing can be performed using any of a variety of section sizes and/or geometries beyond those illustrated in FIG. 4.

Screenshot 405 includes sections 452, 454, 456, and 458. In the example of FIG. 4, each of sections 452, 454, 456, and 458 includes a visual element of UI 410. A visual element is a component of a UI such as a widget or other mechanism. In one aspect, a visual element is a component that is configured to receive user input, though this need not be the case. Referring to FIG. 4, section 452 includes a text box type of visual element. Section 454 includes a drop-down selection box type of visual element. Section 456 includes radio button type of visual elements. Section 458 includes a button type of visual element. The examples provided in FIG. 4 are for purposes of illustration and, as such, are not intended to limit the embodiments disclosed herein.

FIG. 4 illustrates that sections of screenshot 405 are associated with particular sub-segments of segment 430. As pictured, section 452 is associated with sub-segment 440; section 454 is associated with sub-segment 435; section 456 is associated with sub-segment 450; and section 458 is associated with sub-segment 445.

In one aspect, associations between sections of screenshot 405 and sub-segments 435, 440, 445, and 450 can be determined through an analysis of source code 415 and, more particularly, of segment 430. For example, responsive to determining that segment 430 has executed and specifies UI 410, sub-segments of segment 430 can be evaluated. Development application 125, for example, can determine the location of UI 410 upon display device 235 or, if not displayed, where UI 410 would be displayed. Accordingly, the location of each of the visual elements specified by sub-segments 435, 440, 445, and 450 can be determined at least relative to the determined location of UI 410. Because distances between visual elements, size of display device 235, and the like are known, screenshot 405 can be subdivided into sections so that each section includes at least one visual element, more than one visual element, or the like. This ability to subdivide screenshot 405 into sections allows sub-segments of a segment of source code to be correlated or linked with sections of a screenshot.

In one aspect, screenshot 405 can be stored with the described association information. Screenshot 405 is stored in association with segment 430. Further, each of sections 452, 454, 456, and 458 is stored in association with the appropriate sub-segment. Accordingly, when screenshot 405 is retrieved or viewed during a search for source code, a selection of a particular section, e.g., section 456, causes retrieval of a particular sub-segment such as sub-segment 450 from the appropriate source code repository or navigation to the appropriate information page for retrieving sub-segment 450.

In addition, a region of screenshot 405 can be defined that, when selected, corresponds to and retrieves segment 430 as opposed to any particular sub-segment if so desired. For example, such a region can be provided along the top of screenshot 405, along the bottom of screenshot 405, the left or right edge(s) of screenshot 405, etc. The different sections of screenshot 405 further can be visually illustrated if desired when screenshot 405 is displayed.

FIG. 4 illustrates another aspect of tagging. As shown, when a screenshot is subdivided, each resulting section may be associated with one or more tags. For purposes of illustration, section 452 is associated with tag 460. Section 454 is associated with tag 462. Section 456 is associated with tag 464. Section 458 is associated with tag 466. In view of the association of each section of screenshot 405 with segment 430 and a particular sub-segment of segment 430, each tag is also associated with segment 430 and the particular sub-segment of segment 430. Thus, for example, tag 460 is associated with segment 430 and with sub-segment 435.

Figure 5:
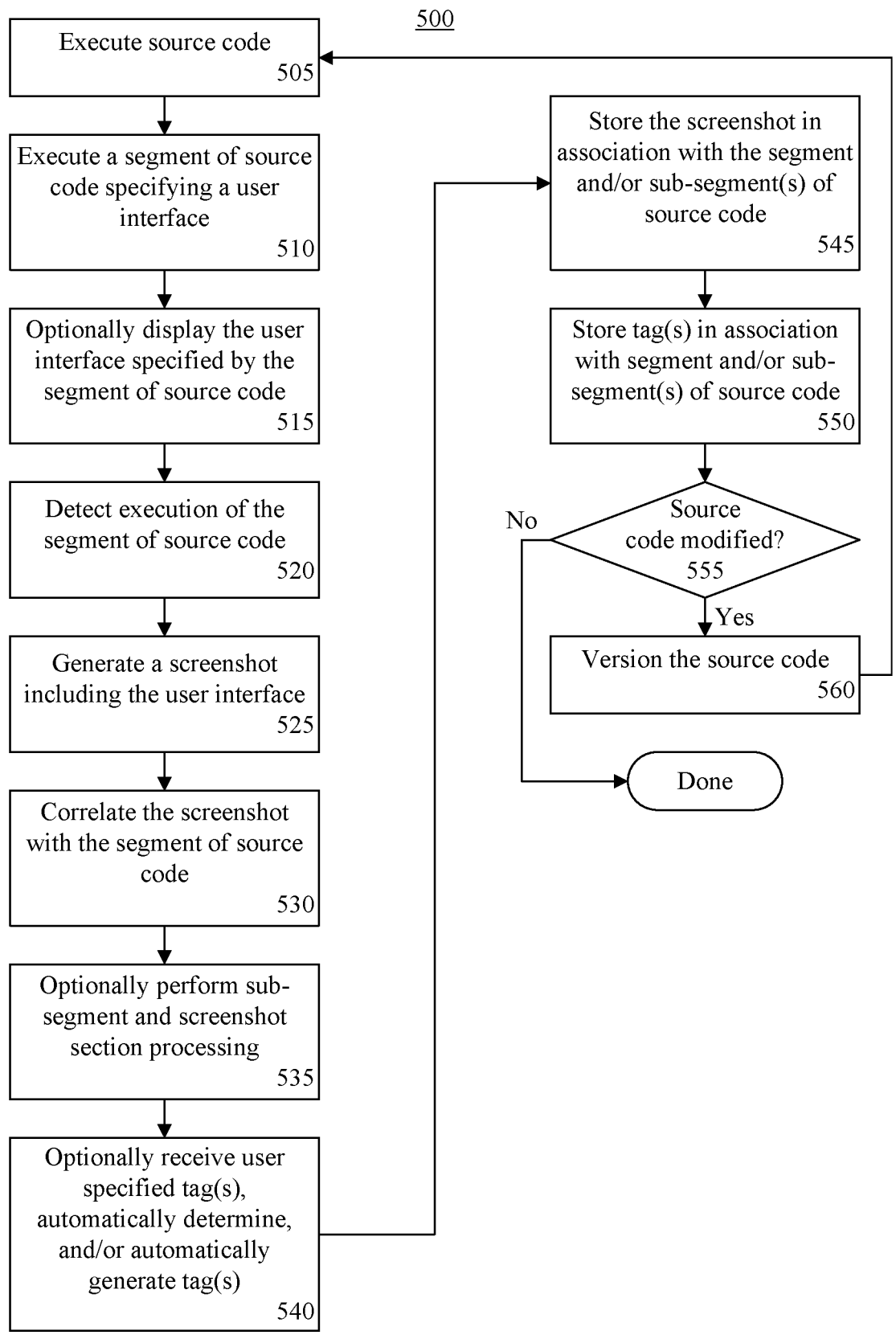
FIG. 5 is a flow chart illustrating an exemplary method of correlating screenshots with source code.

FIG. 5 is a flow chart illustrating an exemplary method 500 of correlating screenshots with source code. Method 500 can be implemented and/or performed by a data processing system such as system 105 described with reference to FIGS. 1 and 2. Method 500 can begin in a state where source code is loaded within the system. Further, a user has requested execution of the source code. For example, the source code can be loaded into development application 125. The user can provide an input requesting execution of the source code. The source code may be executed as part of a test or other software development process.

In block 505, the system executes the source code loaded within the development application. In block 510, the system executes a segment of the source code that specifies a user interface. In block 515, the system optionally displays the user interface specified by the segment of source code upon a display device coupled to the system.

In block 520, the system detects execution of the segment of source code. More particularly, the system detects execution of the segment of source code executed in block 510. Responsive to detecting execution of the segment of source code, the system generates, or initiates generation of, a screenshot in block 525. The screenshot includes the UI specified by the segment of the source code the system detected as being executed. In block 530, the system correlates the screenshot generated in block 525 with the segment of source code executed in block 510. In one aspect, the correlation or association is stored as metadata or as part of metadata.

In block 535, the system optionally performs sub-segment and screenshot section processing. More particularly, if so configured, the system identifies sub-segments of the segment of source code detected as executed in block 520. The system then determines a location of the visual element, or elements, specified by the identified sub-segments of the source code within the screenshot. The system subdivides the screenshot into a plurality of sections. Each section can include at least one visual element and be associated with the particular sub-segment that, when executed, causes the visual element to be displayed.

In block 540, the system optionally receives one or more user-specified tags. Each tag received from the user as an input is associated with the screenshot or a section of the screenshot as specified by the received user input. In another aspect, the system is configured to automatically determine one or more tags. For example, the system can perform an analysis of the segment and/or sub-segment of the source code as the case may be. The system can determine which tags defined within the system match words, text, symbols, and/or phrases found within the analyzed segment and/or sub-segment of source code. The system further can automatically generate one or more tags according to the analysis, for example, by using a portion of the source code from a particular location within the segment and/or sub-segment of source code such as a title, remarks, or the like as a tag. In block 545, the screenshot is stored in association with the segment of source code. In the case where the screenshot is subdivided into two or more sections, each section is stored in association with the appropriate sub-segment of source code.

In block 550, the system stores any tags received from a user, automatically determined by the system, and/or automatically generated by the system within block 540 with the segment of source code. In the case where the screenshot is subdivided into two or more sections, tags are stored in association with the appropriate sub-segments of source code as specified by the user input received in block 540 and/or in accordance with the particular segment and/or sub-segment analyzed by the system. In one aspect, any tags that are ascertained, whether from the user or from the system, may be stored as metadata or as part of the metadata.

In block 555, the system determines whether the source code has been modified. For example, subsequent to receiving one or more user inputs to the source code, the system can perform a comparison of the source code in its current state with the state of the source code in existence prior to receipt of the user inputs, e.g., the state of the source code in existence at the time the screen shot was generated in block 525. If the source code has been modified since that time, method 500 can proceed to block 560. In another example, if the segment of source code or a sub-segment thereof has been modified, method 500 can proceed to block 560. If the source code has not been modified, method 500 can end.

In block 560, the system versions the source code. The system creates a new version of the source code. The new version of the source code includes the changes that were introduced by the user into the source code, e.g., via an editor. For example, the source code may exist as one or more files having a particular version number associated therewith. In block 560, the system can copy the file(s) and associate a new version number with the resulting file or files. The version number can be incorporated into the name of a directory including the source code, incorporated into the name of the file(s), or the like. The versioned source code is therefore distinguished and independent from the source code from which the screenshot of block 525 was generated.

Having generated a new version of the source code, method 500 can loop back to block 505 and continue processing. For example, having modified the source code, the user may request execution of the modified source code. Method 500 can proceed as previously described. Rather than executing the prior version of the source code, however, the new version of the source code, e.g., the modified source code, is executed. The screenshot that is generated during the next iteration of method 500 is a second and different screenshot that includes a modified version of the UI as specified by the modified source code. The second screenshot is stored in association with the modified segment and/or sub-segment of the source code as the case may be.

Method 500 can be repeated as a user continues to modify or revise the source code specifying a UI. Each modification and subsequent execution of the modified segment of source code can result in a new and different version of the source code being created, the generation of a new and different screenshot, and the association of the new and different screenshot with the new version of the segment of the source code. In this manner, a revision or version history is created for the source code. Each new version of the segment of source code that is created is associated with its own screenshot of the UI generated by that version of the source code and tag(s) as described. Further, screenshots can be subdivided as described.

In another aspect, when a change to the segment of source code does not result in a modification, or change, in appearance of the UI, the screenshot generated for the modified segment of source code need not be stored. The modified segment of source code, e.g., the different version of the source code, can be associated or correlated with the previously generated screenshot. Accordingly, the system avoids storing redundant or identical screenshots for changes to the segment of source code that do not have any effect upon the appearance of the UI. As an example, as part of block 545, the system can perform a comparison of the screenshot generated in block 525 with the screenshot generated during a prior iteration of block 525 or for the immediately prior version of the segment of source code. Responsive to determining that the two screenshots are the same, i.e., that the UI included in each screenshot is the same, the second screenshot may be discarded and not stored.

In still another aspect, the process described with reference to FIG. 5 can be performed for each of a plurality of different execution environments. For example, method 500 can be performed using source code that is written for a first execution environment having a first operating system and/or a first type of browser. Method 500 also can be performed for a second and different execution environment having a second and different operating system and/or a second and different type of browser. As such, a version history as previously described can be developed for each different execution environment for which the source code is being developed. The execution environment can be specified by the versioning, by the tag(s) associated with the screenshots or sections thereof, or the like.

Figure 6:
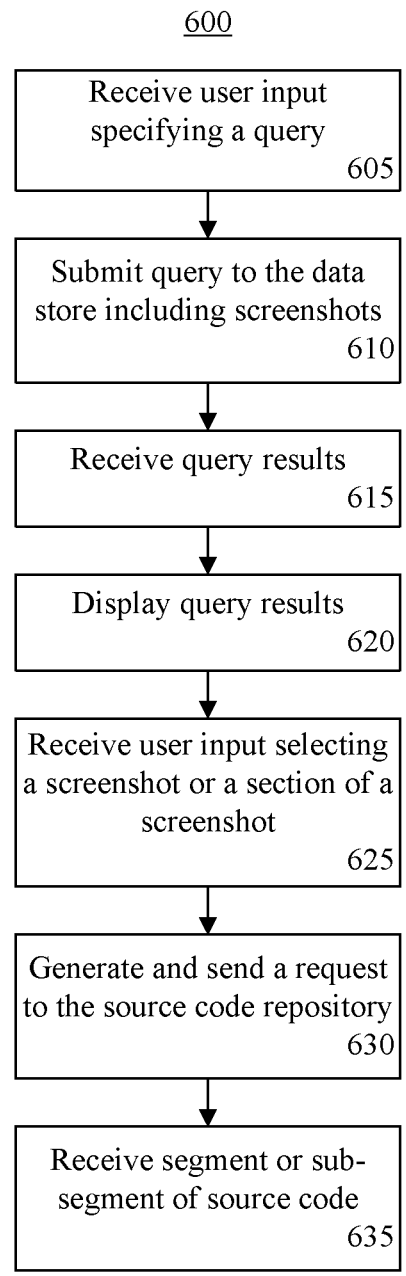
FIG. 6 is a flow chart illustrating an exemplary method of searching for source code.

FIG. 6 is a flow chart illustrating an exemplary method 600 of searching for source code. In one aspect, method 600 can be implemented by a network computing system and/or a data processing system as described with reference to FIGS. 1 and/or 2. Method 600 presumes that a history of different versions of source code with associated screenshots and optionally tags has been created and stored.

Accordingly, method 600 can begin in block 605 where a user input specifying a query is received. The query can specify any of a variety of arguments such as one or more tag or tag combinations that a screenshot must have to be returned as a query result, one or more tag or tag combinations that a screenshot should not have to be returned as a query result, data restrictions and/or ranges, etc. The query further can include arguments specifying the particular execution environment for which source code is desired. As noted, in one aspect, such information can be specified as a tag or plurality of tags.

In block 610, the data processing system of the user can submit the query to the screenshot repository. In block 615, the data processing system receives the query result. The query result includes one or more screenshots with any tag(s) that may be associated with the screenshot(s) and/or sections thereof.

In block 620, the query results are displayed. The user, for example, may review the screenshots and any associated tags. Any screenshots that are subdivided into sections can include visible lines indicating the sections. Further, tags are shown and can be shown in association with the particular section of the screenshot to which each respective tag corresponds.

In block 625, the data processing system can receive a user input selecting a screenshot or section of a screenshot. In block 630, the data processing system generates and sends a request to the source code repository. The request is a request for the segment and/or sub-segment of source code that is associated with the selected screenshot or section of the screenshot. The data repository sends the requested segment or sub-segment of source code. In block 635, the data processing system receives the requested source code. Having received the requested source code, the user may review, copy, or otherwise incorporate the source code into a current software project.

The inventive arrangements disclosed herein generate a screenshot that is stored in association with source code. One or more tags also may be stored in association with the screenshot. Users later may search the screenshot repository and tag data to locate source code that specifies a desired UI or that includes a particular UI feature.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "responsive to determining" or "responsive to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method within a client computer, comprising:
   forwarding, based upon input from a user, a query to a server;
   receiving, from the server, search results based upon a search of a screenshot repository using the query;
   presenting the search results to the user;
   receiving a selection, from the user, of at least a portion of a screenshot from the search results;
   receiving, from a source code repository, source code corresponding to the selection.
2. The method of claim 1, wherein
   the search results includes screenshots with associated tags.
3. The method of claim 2, wherein
   during the presenting, a tag is displayed with an associated screenshot.
4. The method of claim 2, wherein
   a plurality of tags are associated with a particular screenshot.
5. The method of claim 1, wherein
   a particular screenshot is divided into a plurality of sections.
6. The method of claim 5, wherein
   each of the plurality of sections includes an associated tag.
7. A client computer hardware system, comprising:
   a hardware processor configured to initiate the following executable operations:
      forwarding, based upon input from a user, a query to a server;
      receiving, from the server, search results based upon a search of a screenshot repository using the query;
      presenting the search results to the user;
      receiving a selection, from the user, of at least a portion of a screenshot from the search results;
      receiving, from a source code repository, source code corresponding to the selection.
8. The system of claim 7, wherein
   the search results includes screenshots with associated tags.
9. The system of claim 8, wherein
   during the presenting, a tag is displayed with an associated screenshot.
10. The system of claim 8, wherein
    a plurality of tags are associated with a particular screenshot.
11. The system of claim 7, wherein
    a particular screenshot is divided into a plurality of sections.
12. The system of claim 11, wherein
    each of the plurality of sections includes an associated tag.
13. A computer program product, comprising
    a computer hardware storage device having program code stored thereon,
    the program code executable by a client computer hardware system including a hardware processor to perform the following:
       forwarding, based upon input from a user, a query to a server;
       receiving, from the server, search results based upon a search of a screenshot repository using the query;
       presenting the search results to the user;
       receiving a selection, from the user, of at least a portion of a screenshot from the search results;
       receiving, from a source code repository, source code corresponding to the selection.
14. The computer program product of claim 13, wherein
    the search results includes screenshots with associated tags.
15. The computer program product of claim 14, wherein
    during the presenting, a tag is displayed with an associated screenshot.
16. The computer program product of claim 14, wherein
    a plurality of tags are associated with a particular screenshot.
17. The computer program product of claim 13, wherein
    a particular screenshot is divided into a plurality of sections.
18. The computer program product of claim 17, wherein
    each of the plurality of sections includes an associated tag.

* * * * *